(12) United States Patent
Matsumoto et al.

(10) Patent No.: US 8,502,425 B2
(45) Date of Patent: Aug. 6, 2013

(54) TOTALLY ENCLOSED MOTOR

(75) Inventors: Hironori Matsumoto, Hitachi (JP); Atsushi Otake, Hitachiota (JP); Hiroshi Morita, Mito (JP); Junpei Kusukawa, Hitachinaka (JP); Kinya Kobayashi, Hitachi (JP); Junnosuke Nakatsugawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 13/014,079

(22) Filed: Jan. 26, 2011

(65) Prior Publication Data

US 2011/0181138 A1 Jul. 28, 2011

(30) Foreign Application Priority Data

Jan. 26, 2010 (JP) .................................. 2010-013822

(51) Int. Cl.
*H02K 9/00* (2006.01)
(52) U.S. Cl.
USPC ............................................ 310/59; 310/52
(58) Field of Classification Search
USPC ...................................... 310/59, 61, 52, 58, 64
See application file for complete search history.

(56) References Cited

U.S. PATENT DOCUMENTS

| | | | | |
|---|---|---|---|---|
| 5,925,947 A | * | 7/1999 | Kajiwara et al. | 310/64 |
| 6,734,584 B1 | * | 5/2004 | Browne et al. | 310/58 |
| 7,629,717 B2 | * | 12/2009 | Kanei et al. | 310/64 |
| 7,683,510 B2 | * | 3/2010 | Pellegrino | 310/58 |
| 2007/0284955 A1 | * | 12/2007 | Chang et al. | 310/59 |

FOREIGN PATENT DOCUMENTS

| | | |
|---|---|---|
| JP | S58-207849 | 12/1983 |
| JP | S61-43765 | 3/1986 |
| JP | S62-088454 | 6/1987 |
| JP | S63-143032 | 9/1988 |
| JP | 08-275421 | 10/1996 |
| JP | 2007-110828 | 4/2007 |
| JP | 2007-244177 | 9/2007 |

\* cited by examiner

*Primary Examiner* — Nguyen N Hanh
(74) *Attorney, Agent, or Firm* — Antonelli, Terry, Stout & Kraus, LLP.

(57) ABSTRACT

A totally enclosed motor which includes a rotor disposed inside a housing and a heat of the rotor is transferred to the housing, a stator disposed inside the housing and a heat of the stator is transferred to the housing, and an inner fin which is disposed in the rotor and agitates air inside the housing. The totally enclosed motor is cooled by a forced convection by an outer fan disposed outside the housing, or by a natural convention in the vicinity of an outer surface of the housing, and a shape of the rotor is different between one end side and the other end side of the rotor in an extending direction of a rotary shaft of the rotor.

9 Claims, 10 Drawing Sheets

Cross sectional view of rotor 1 of FIG. 1A
as seen from direction indicated by arrow A Cross sectional view of rotor 31 of FIG. 4A
as seen from direction indicated by arrow B Cross sectional view of rotor 61 of FIG. 7A
as seen from direction indicated by arrow C Cross sectional view of rotor 101 of FIG. 9
as seen from direction indicated by arrow D Cross sectional view of rotor 201 of FIG. 13
as seen from direction indicated by arrow D

TOTALLY ENCLOSED MOTOR

CROSS REFERENCE TO RELATED APPLICATIONS

This application claims the foreign priority benefit under Title 35, United States Code, §119(a)-(d) of Japanese Patent Application No. 2010-013822, filed on Jan. 26, 2010, the contents of which are hereby incorporated by reference.

BACKGROUND OF THE INVENTION

1. Field of the Invention

The present invention relates to a totally enclosed motor, and more particularly, to a cooling structure of the motor.

2. Description of Related Art

FIG. 9 is a vertical cross sectional view in an axial direction of a conventional totally enclosed motor 100.

Conventionally, as shown in FIG. 9, the totally enclosed motor 100 has a structure for housing a rotor 101 and a stator 102 which generate a mechanical rotative force from electric energy, a part of a rotary shaft 103 which is connected to the rotor 101 in a unified manner and transmits the generated rotative force to outside, and a bearing 104 which supports the rotary shaft 103, inside a housing 105 consisting of a frame 105*f* and an end bracket 105*e* without disposing an opening portion.

Since the totally enclosed motor 100 has no opening portion, the totally enclosed motor 100 is prevented from entering of dusts in the air and has a sound-proof structure.

A heat of, for example, an iron loss generated in the totally enclosed motor 100 is cooled by the following mechanism shown in FIG. 10. FIG. 10 is an illustration showing a heat flow of the totally enclosed motor 100 of FIG. 9.

A heat generated in the rotor 101 is carried by heat conduction mainly in the rotary shaft 103 which is connected to the rotor 101 in a unified manner and the bearing 104 which supports the rotary shaft 103 while being supported by the housing 105, and transmitted to the housing 105. A heat generated in the stator 102 is carried to the housing 105 by heat conduction in a portion where an outer circumferential portion of the stator 102 is in contact with an inner wall of the housing 105 and by a heat transfer, for example, by heat radiation in the case when there is a clearance (gap) between the outer circumferential portion of the stator 102 and the inner wall of the housing 105.

In addition, a heat released in a space inside the housing 105 from the surfaces of the rotor 101 and the stator 102 by convection or radiation heats up air inside the housing 105. The heated up air inside the housing 105 is agitated by an inner cooling fin 106 (hereinafter, referred to as inner fin 106) which is fixed to the rotor 101 and rotates together with the rotor 101, and the heat of the heated up air is transferred to the housing 105.

An outer cooling fan 108 (hereinafter, referred to as outer fan 108) is disposed on one end side of the rotary shaft 103 in the extending direction at outside of the housing 105 in such a manner that the outer fan 108 is covered by an end fan cover 107 having a wind inlet and a wind outlet and fixed to the rotary shaft 103. The outer fan 108 generates a cooling wind flowing on a surface of a heat dissipation fin (not shown) which is formed on an outer periphery surface of the housing 105 by the rotation of the rotor 101, and the heat transferred to the housing 105 is discharged from the heat dissipation fin by the cooling wind. In this case, the end fan cover 107 has such a structure that end fan cover 107 partially covers the outer periphery of the housing 105 in the axial direction so as to guide the cooling wind toward the heat dissipation fin in order to efficiently cool the heat dissipation fin by the cooling wind of the outer fan 108 by blowing the cooling wind toward the heat dissipation fin on the housing 105. On the other hand, in the case that there is no outer fan 108, the heat transferred to the housing 105 is discharged in the atmosphere from the surface of the housing 105 by natural convection.

Meanwhile, in the inner fin 106 disposed on the rotor 101, a plate fin 106*a* which is formed on a surface vertical to each side of the rotary shaft 103 of the rotor 101 in the extending direction is disposed in parallel with the extending direction of the rotary shaft 103 and outward in the radial direction from the rotary shaft 103 as shown in FIG. 11 that is the rotor 101 of FIG. 9 as seen from a direction indicated by an arrow D, in consideration of molding easiness and an identical agitation performance for forward and reverse rotations of the rotor 101.

However, in the inner fin 106 of this structure, since a turbulent flow occurs around the center side of the fin 106*a* of the inner fin 106, while a cooling effect is obtained by blowing air outward from the center side of the inner fin 106 by the centrifugal force and agitating air inside the housing 105, the cooling efficiency is not good by disturbance of a laminar flow flowing outward from the center side of the inner fin 106 by the turbulent flow.

FIG. 12 is a vertical cross sectional view showing an air flow around the inner fin 106 of the conventional totally enclosed motor 100 of FIG. 9 by arrows.

As shown by the arrows in FIG. 12, air agitated by the inner fin 106 only circulates around the inner fin 106, and it was demonstrated that a wind velocity between the housing 105 and around coil end 109 was extremely decreased. Therefore, a space inside the housing 105 is not cooled homogeneously.

In addition, in a small gap between the rotor 101 and the stator 102, there is really a very little wind flow between a load side 110 where a motor load is disposed at end portions of the rotor 101 and the stator 102 in the axial direction (a right-left direction in FIG. 12) inside the housing 105 and a no-load side 111. Then, the inner fin 106 agitates air in a space on the load side 110 inside the housing 105 and air in a space on the no-load side 111, independently. As a result, only a local cooling effect is obtained, and an efficient cooling can not be achieved.

Regarding the structure of the inner fin 106, in order to improve the cooling performance, Japanese Patent Publication No. S58-207849 (see, for example, FIG. 1) proposed the following method that as shown in FIG. 13 that is a vertical cross sectional view of a rotor 201 in the axial direction, in the rotor 201 of a squirrel-cage motor with an end ring 212, a conductor 213 which is located on the outer side than the end ring 212 and inserted into the rotor 201 so as to pass through the rotor 201 in the direction of the rotary shaft 203 is disposed to be inclined in a direction opposite to a rotation direction 214. As a result, according to the method, an agitation power of a space inside the motor is increased by the rotation of the conductor 213 located on the outer side than the end ring 212.

In addition, in a totally enclosed motor 300 of Japanese Utility Model Publication No. S61-43765 (see, for example, FIG. 1), the following method is disclosed, in which wind holes 351, 352 are disposed in a rotor 301 and a stator 302, respectively, and air inside a housing 305 is forcibly circulated by an inner cooling fan 316 (hereinafter, referred to as inner fan 316) disposed inside the totally enclosed motor 300 and connected to a rotary shaft 303, as shown in FIG. 15 that is a vertical cross sectional view in the axial direction of the totally enclosed motor 300.

SUMMARY OF THE INVENTION

Recently, from energy saving and resource saving points of view, a reduction in size and weight of a motor has been desired and a demand for a totally enclosed motor has been increased.

When a motor is downsized, a temperature may be raised more than before by increase in heat generation density caused by increase in winding wire density, and accordingly, an improvement of a cooling performance become essential. Downsizing of a rotor and a stator inevitably causes increase in power loss due to increase in winding wire resistance accompanied by a reduction of a heat dissipation area and increase in a copper loss caused by magnetic saturation. Therefore, there is a disadvantage that a heat generation of the rotor and the stator becomes large. In addition, with respect to downsizing of the housing and the other structural members, there is a problem that heat dissipation areas of the structural members shrink.

Then, developments of a cooling structure and a cooling method which have characteristics superior to the conventional cooling performance have been a big issue in downsizing a totally enclosed motor.

Japanese Patent Publication No. S58-207849 proposed a method for improving a cooling performance by changing an installation structure of the conductor 213 which passes through the rotor 201 shown in FIG. 13, that is, by the inclined structure of the conductor 213 shown in FIG. 14 in a direction opposite to the rotation direction. However, in this change, it is required to separately work/mold the end ring 212 and the conductor 213 passing through the rotor 201, and accordingly, the manufacturing cost and the component cost may increase. In addition, when the rotor 201 rotates in the forward and the reverse directions, the cooling effect becomes different in each of the rotation directions since a shape of the rotating conductor 213 against air is different between the forward direction and the reverse direction. Furthermore, as with a cooling structure of an existing totally enclosed motor, since the load side 210 that is one side of the rotary shaft 203 in the extending direction and the no-load side 211 that is the other side are cooled separately, the cooling structure is not the efficient structure.

In addition, in Japanese Utility Model Publication No. S61-43765, as shown in FIG. 15, a circulating air flow (see arrows in FIG. 15) passing through the wind holes 351, 352 is generated by disposing the inner fan 316. However, a length of the totally enclosed motor 300 in the direction of the rotary shaft 303 increases due to installation of the inner fan 316, and a volume and a cost of the totally enclosed motor 300 increase, thereby resulting in difficulty for reducing in size and weight of the totally enclosed motor 300.

In consideration of the above issues, an object of the present invention is to provide a totally enclosed motor which is small and has a high cooling performance by using a cooling structure which agitates air inside a totally enclosed housing in order to obtain a cooling effect.

In order to achieve the foregoing object, according to the present invention, there is provided a totally enclosed motor which includes a rotor disposed inside a housing and a heat of the rotor is transferred to the housing, a stator disposed inside the housing and a heat of the stator is transferred to the housing, and an inner fin which is disposed in the rotor and agitates air inside the housing. The totally enclosed motor is cooled by a forced convection by an outer fan disposed outside the housing, or by a natural convention in the vicinity of an outer surface of the housing, and a shape of the rotor is different between one end side and the other end side of the rotor in an extending direction of a rotary shaft of the rotor.

According to the present invention, a totally enclosed motor which is small and has a high cooling performance can be realized.

DETAILED DESCRIPTION OF THE PREFERRED EMBODIMENT

Figure 1A:
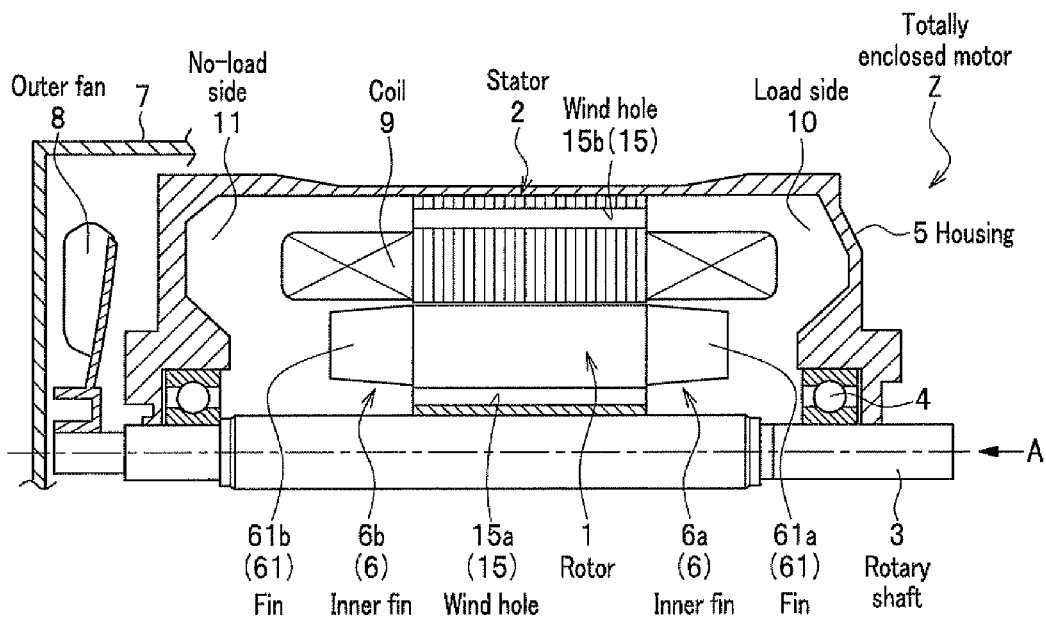
FIG. 1A is a vertical cross sectional view of a totally enclosed motor in an axial direction according to a first embodiment of the present invention.

Hereinafter, embodiments of the present invention will be explained in reference to drawings.

It is noted that the drawings to be used for the following explanations are schematic ones, and for example, a relation between a thickness and a planar dimension and a ratio between thicknesses of respective layers may be different from actual ones. Therefore, for example, it is required to determine a specific thickness and a specific dimension in consideration of the following explanations. Furthermore, the drawings having a different dimensional relation and a different ratio between the constituents with each other may be included in the drawings.

Figure 1B:
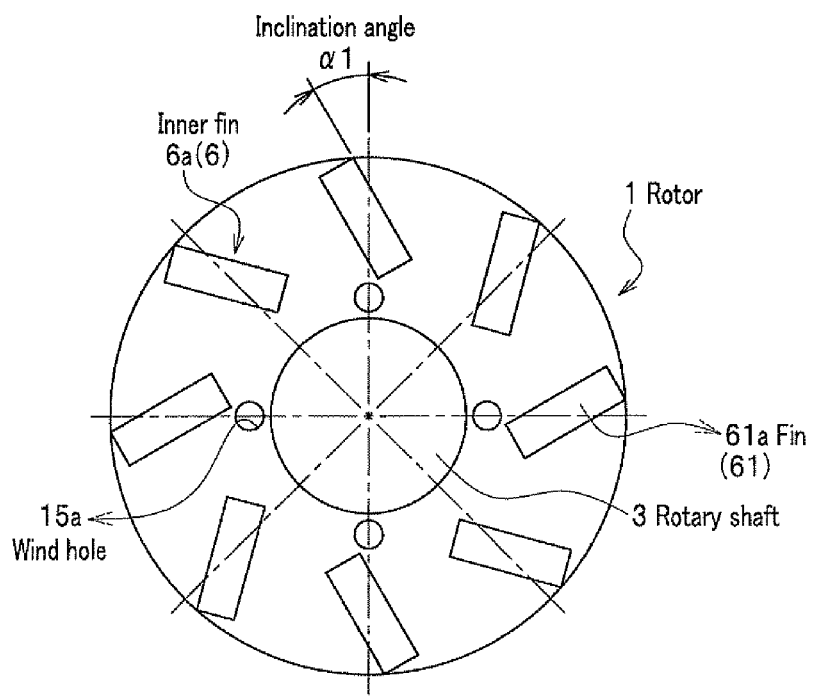
FIG. 1B is a cross sectional view of a rotor of the totally enclosed motor of FIG. 1A as seen from a direction indicated by an arrow A.

FIG. 1A is a vertical cross sectional view of a totally enclosed motor Z in the axial direction according to a first embodiment of the present invention, and FIG. 1B is a cross sectional view of a rotor 1 of the totally enclosed motor Z of FIG. 1A as seen from a direction indicated by an arrow A.

Summary of Totally Enclosed Motor Z According to First Embodiment

The totally enclosed motor Z according to a first embodiment has a configuration of a cooling structure where air inside a housing 5 enclosing a rotor 1 and a stator 2 is agitated to cool the air by rotation of the rotor 1, and provide the cooling structure having a high cooling performance by generating an air flow circulating in a space inside the housing 5, as well as improving an agitation power of the air inside the housing 5 without changing a frame of the housing 5.

Hence, the totally enclosed motor Z has an inner fin 6 which is disposed in parallel with a rotary shaft 3 of the rotor 1 and in the radial direction centered around a rotation center of the rotary shaft 3 (rotor 1), and as shown in FIG. 1B, a fin 61 constituting the inner fin 6 is inclined to a direction different from the radial direction centered around the rotation center of the rotary shaft 3 at both ends of the rotary shaft 3 of the rotor 1 in the extending direction. In addition, the totally enclosed motor Z is provided with wind holes 15a, 15b passing through between a load side 10 where a motor load (not shown) is installed inside the housing 5 and a no-load side 11, in order to achieve circulation of an air flow inside the housing 5.

<Total Structure of Totally Enclosed Motor Z>

The totally enclosed motor Z shown in FIG. 1A includes the rotor 1 to which, for example, a magnet and the rotary shaft 3 are fixed, the stator 2 having a laminated iron core and a coil 9 which is wound around the laminated iron core and to which current is applied, the housing 5 provided with a bearing 4 which rotatably supports the rotary shaft 3 and covering the rotor 1 and the stator 2 against the external space, an outer fan 8 fixed to the rotary shaft 3 at outside of the housing 5 for cooling a heat transferred to the housing 5, and an end fan cover 7 covering the outer fan 8 and a part of the housing 5 and guiding a wind by the outer fan 8 toward the housing 5. It is noted that the heat transferred to the housing 5 is also discharged in the atmosphere from the outer surface of the housing 5 by natural convection of air.

The totally enclosed motor Z houses the rotor 1 and the stator 2 inside the housing 5 in order to avoid entering of dusts and the like in the air. It is noted that, in FIG. 1A, an inner portion of the housing 5 on the side that a motor load (not shown) is applied to the rotary shaft 3 of the totally enclosed motor Z is called a load side 10, and an inner portion of the housing 5 on the side of no motor load is called a no-load side 11.

In the rotor 1, a wind hole 15a passing through the load side 10 and the no-load side 11 is bored so that air on the load side 10 and the no-load side inside the housing 5 communicate with each other.

Similarly, in the stator 2, a wind hole 15b passing through the load side 10 and the no-load side 11 is bored so that air on the load side 10 and the no-load side inside the housing 5 communicate with each other.

<Inner Fin 6 (6a, 6b) of Rotor 1>

The totally enclosed motor Z is provided with an inner fin 6 (6a, 6b) in parallel with the extending direction of the rotary shaft 3 and in the radial direction centered around a rotation center of the rotary shaft 3 (rotor 1) at one end or both ends of the rotary shaft 3 of the rotor 1 in the extending direction, in order to cool heats of, for example, the rotor 1 and stator 2.

Meanwhile, the inner fin 6 on the load side 10 is called an inner fin 6a, and the inner fin 6 on the no-load side 11 is called an inner fin 6b.

As shown in FIG. 1B, the inner fin 6a on the load side 10 has a plurality of fins 61a, and at least one of the fins 61a is formed to be inclined from the radial direction centered around the rotation center of the rotary shaft 3. Similarly, the inner fin 6b having a plurality of fins 61b is disposed in the rotor 1 on the no-load side 11 inside the housing 15.

Here, it is preferable that all fins 61 of the inner fin 6 on the load side 10 or the no-load side 11 are inclined from the radial direction centered around the rotation center of the rotary shaft 3 at an identical angle (for example, angle α1) and in the same direction as shown in FIG. 1B, in order to efficiently generate an air flow inside the housing 5 by the inner fin 6 and increase the agitation power.

The reason is that according to the well-known Euler's formula for a pump, when the fin 61 is inclined from the radial direction centered around the rotation center of the rotary shaft 3, an angular momentum given to an air flow blown out from the inner fan 6 by the rotation of the motor becomes large in comparison with the case of no inclination. As a result, an air volume and a wind velocity increase, and a pressure difference of the air flow between the center side and the outer side of the inner fin 6 is enlarged.

Figure 2:
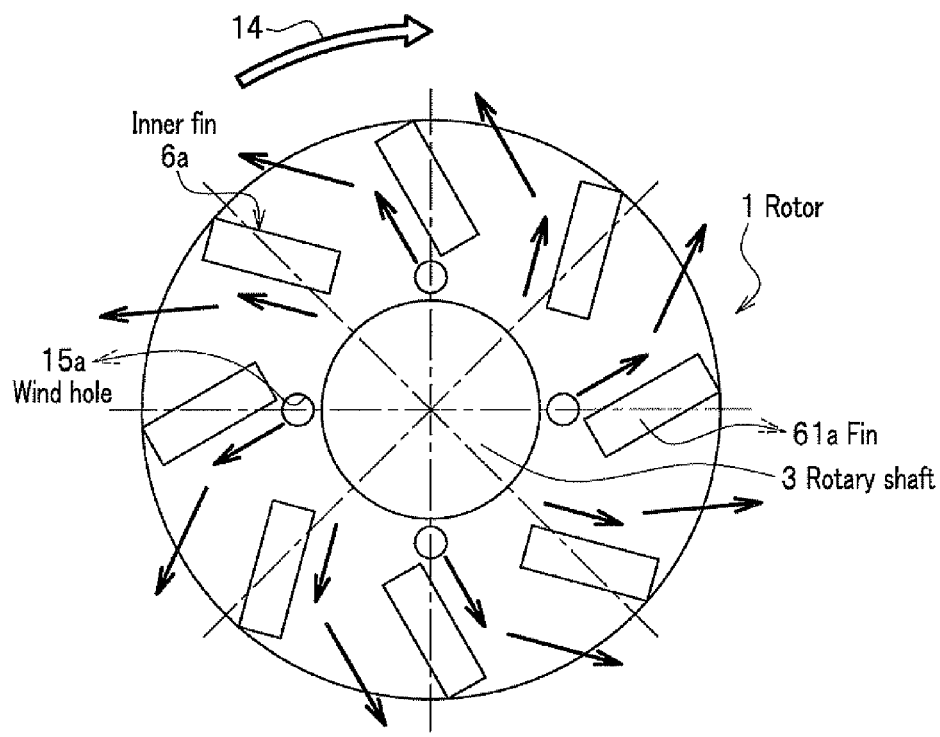
FIG. 2 is a cross sectional view of the rotor of FIG. 1A as seen from a direction indicated by the arrow A, showing a rotation direction of the rotor and a wind direction around an inner fin according to the first embodiment.

FIG. 2 is a cross sectional view of the rotor 1 of FIG. 1A according to the first embodiment as seen from a direction indicated by the arrow A, showing a rotation direction 14 of the rotor 1 and a wind direction around the inner fin 6a. The rotation direction (white arrow) of the rotor 1 and the air flow direction (black arrows) by the inner fin 6 are shown in FIG. 2.

Figure 9:
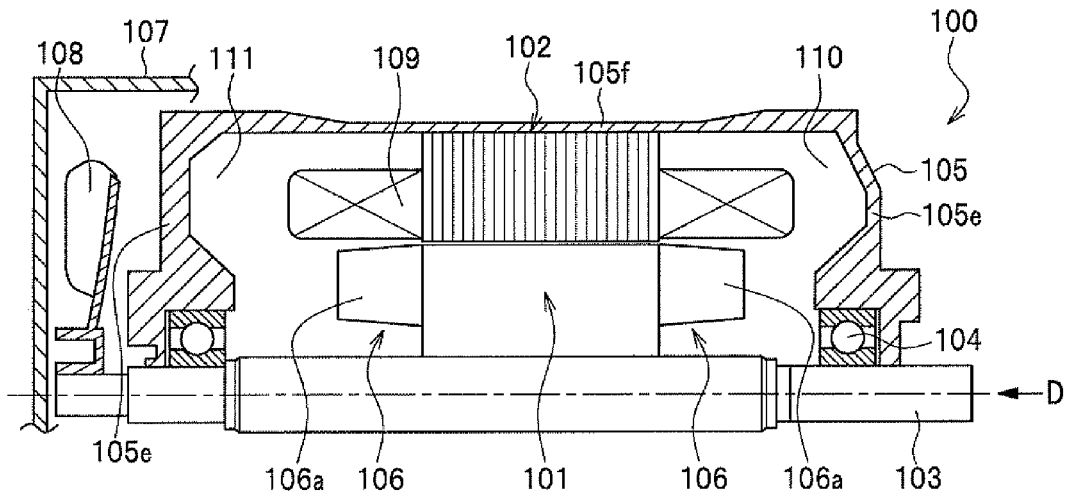
FIG. 9 is a vertical cross sectional view of a conventional totally enclosed motor in an axial direction.
Figure 10:
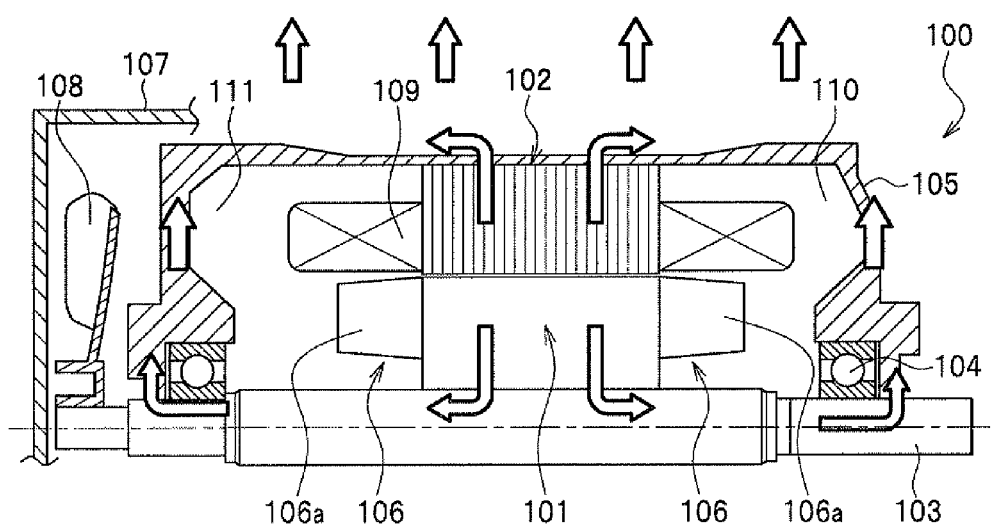
FIG. 10 is an illustration showing a heat flow of the conventional totally enclosed motor of FIG. 9.
Figure 11:
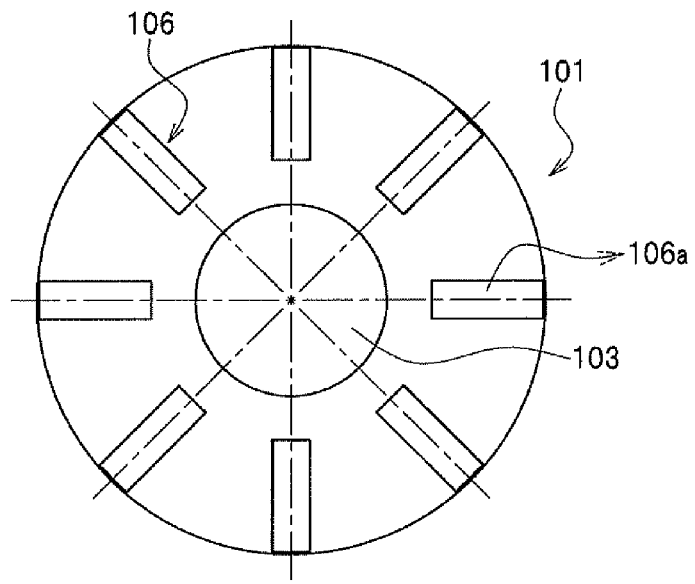
FIG. 11 is across sectional view of the conventional rotor of FIG. 9 as seen from a direction indicated by an arrow D.
Figure 12:
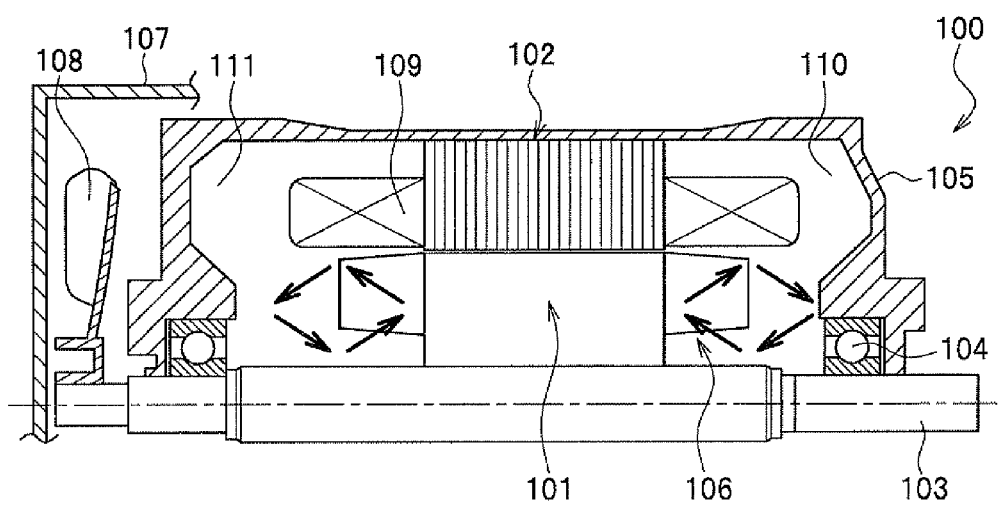
FIG. 12 is a vertical cross sectional view showing an air flow around an inner fin of the conventional totally enclosed motor of FIG. 9.
Figure 13:
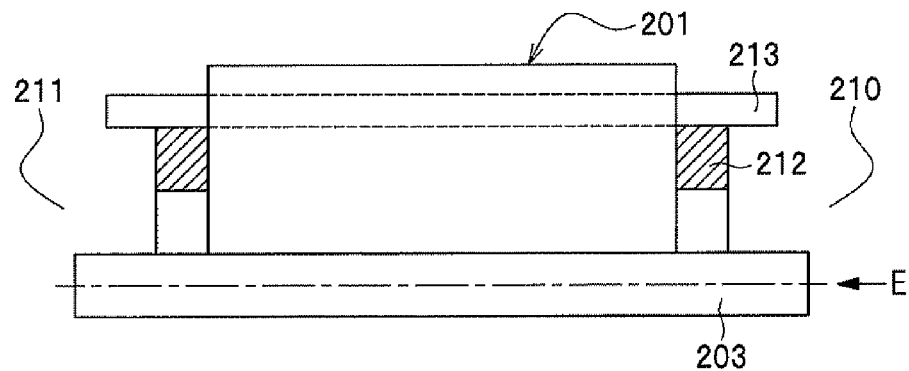
FIG. 13 is a vertical cross sectional view of a rotor of Japanese Patent Publication No. S58-207849 in an axial direction.
Figure 14:
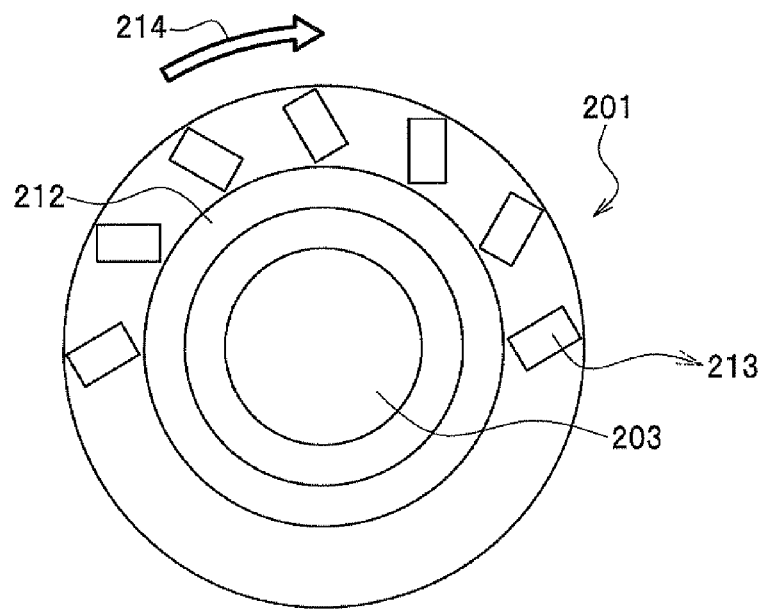
FIG. 14 is a cross sectional view of the rotor of Japanese Patent Publication No. S58-207849 in FIG. 13 as seen from a direction indicated by an arrow E.
Figure 15:
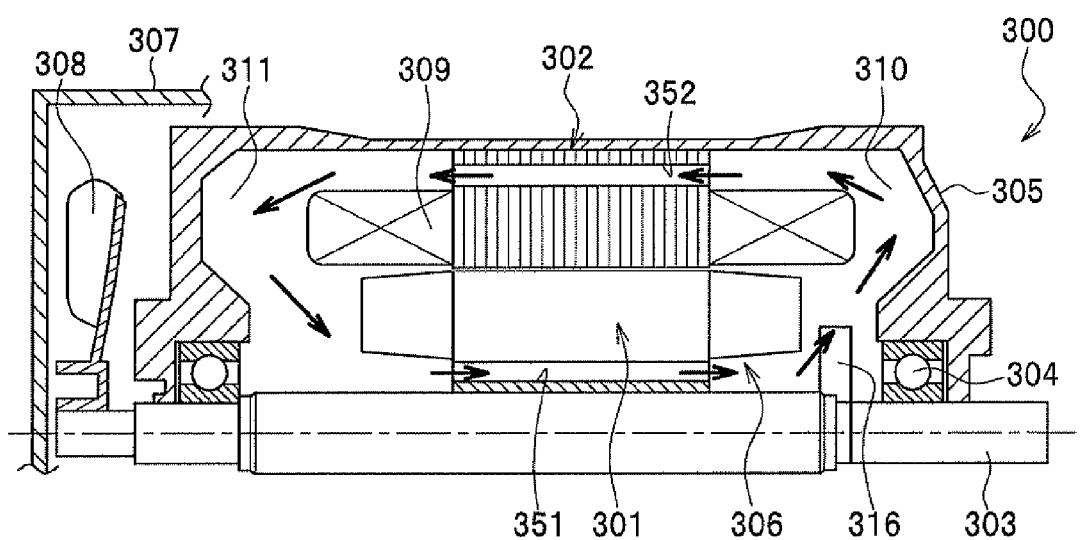
FIG. 15 is a vertical cross sectional view of a totally enclosed motor of Japanese Utility Model Publication No. S61-43765 in an axial direction.

The inner fin 6 has such a structure that all fins 106a of the inner fin 106 formed in the radial direction centered around the rotary shaft 103 shown in the conventional FIG. 9 and FIG. 11, that is, all fins 61a of the inner fin 6a in FIG. 2, are inclined in a direction opposite to the rotation direction 14 from the radial direction (shown with dotted lines in FIG. 2) centered around the rotation direction of the rotary shaft 3.

Figure 6:
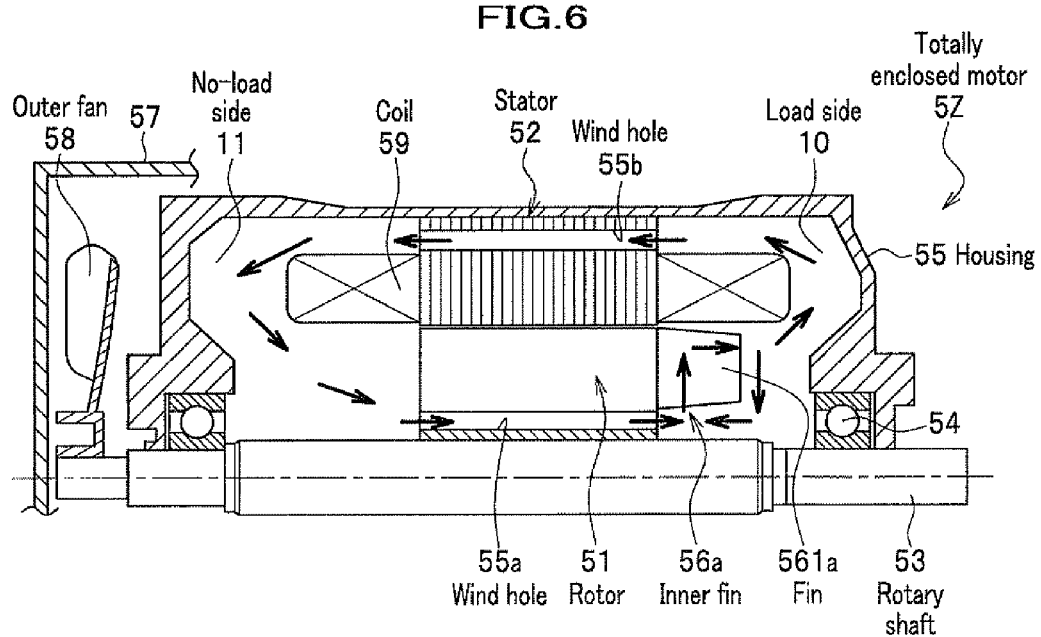
FIG. 6 is a vertical cross sectional view of a totally enclosed motor in an axial direction according to a fifth embodiment of the present invention.

Here, a large difference between the inner fin 6a shown in FIG. 2 and the inner fin 106 shown in the conventional FIG. 6 and FIG. 11 is that, as described above, a pressure difference of air, which is blown out from the center side of the inner fin 6 by the centrifugal force, between the center side and the outer side of the inner fin 6 becomes large, thereby resulting in increase in the air volume and the wind velocity.

In addition, since a turbulent flow around the fin 61a constituting the inner fin 6a is reduced by inclining the fin 61a from the radial direction centered around the rotation center of the rotary shaft 3, the air flows out efficiently. This can be explained by the well-known Euler's formula for a pump.

Namely, since an angle of air flow around the center of the inner fin 6 from the radial direction is different from an angle of air flow flowing out from the inner fin 6 from the radial direction, an angular momentum to be given to the air flow discharged from the inner fin 6 increases, and as a result, a pressure difference between the center side and the outer side of the inner fin 6 becomes large.

Furthermore, since a generation of the turbulent flow around the center side of the fin 61 constituting the inner fin 6 is reduced, the air is blown out efficiently from the inner fin 6.

Namely, when the fin 61 is inclined from the radial direction centered around the rotation center of the rotary shaft 3, the turbulent flow around the fin 61 of the inner fin 6 is reduced because the fin 61 is along the air flow in comparison with the case of no inclination, and the air is efficiently discharged from the inner fin 6, and as a result, the agitation power of air in a space inside the housing 5 can be improved.

This effect can be obtained in both inclining directions of the fin 61 to the right and to the left from the radial direction and regardless of an inclination level of the fin 61 as long as the fin 61 is inclined. However, since a level of the effect varies depending on a rotation velocity of the rotor 1, it is preferable that the inclination angle of the fin 61 is adjusted as appropriate.

As a result, according to the present inner fin 6, a pressure loss between the center side and the outer side of the inner fin 6 becomes large in comparison with the conventional one, and in addition, the air volume and the wind velocity of the air flow blown out by the centrifugal force increase. Therefore, the agitation power by rotation of the rotor 1 of the inner fin 6 increases, thereby resulting in improvement of the cooling performance.

In addition, in the totally enclosed motor Z, an inclination direction and an inclination angle α1 of the inner fin 6 (6a, 6b) disposed on one end side or both end sides of the rotary shaft 3 of the rotor 1 in the extending direction from the radial direction centered around the rotation center of the rotary shaft 3 are set so that pressure distributions of air in a space on the load side 10 and in a space on the no-load side 11 inside the housing 5 are different to each other. The different air pressure distribution means that the agitation power of air on the load side 10 and the no-load side 11 is asymmetric in the axial direction of the rotary shaft 3.

In the foregoing mechanism, for example, when the inner fin 6 is disposed on the load side 10 and the no-load side 11, respectively, a pressure difference between the load side 10 and the no-load side 11 is generated by inclining the fin 61a of the inner fin 6a on the load side 10 and the fin 61b of the inner fin 6b on the no-load side 11 in different directions at different angles with each other, thereby resulting in the different air pressure distributions on the load side 10 and the no-load side 11.

Specifically, the fin 61a of the inner fin 6a on the load side 10 and the fin 61b of the inner fin 6b on the no-load side 11 are disposed so that the angle α1 or the direction of the fin 61a of the inner fin 6a on the load side 10 from the radial direction centered around the rotation center of the rotary shaft 3 is set to be different from the angle or the direction of the fin 61b of the inner fin 6b on the no-load side 11 from the radial direction centered around the rotation center of the rotary shaft 3.

Using this structure, a pressure difference is generated between the load side 10 and the no-load side 11 inside the housing 5 by the rotation of the rotor 1, and air on the load side 10 flows into the no-load side 11 through the wind hole 15a of the rotor 1 and the wind hole 15b of the stator 2, and the air on the no-load side 11 inside the housing 5 flows into the load-side 10 to be circulated, thereby resulting in efficient cooling.

The totally enclosed motor Z can promote circulation of air inside the housing 5 through the wind holes 15a, 15b by forming a shape and/or a setting position of at least one of the fin 61 (61a, 61b) of the inner fin 6 (6a, 6b) on each of the load side 10 and the no-load side 11 so that air pressure distributions in the spaces on the load side 10 and the no-load side 11 inside the housing 5 are caused to be different to each other.

Alternatively, in the totally enclosed motor Z, a number of fin 61 (61a, 61b) constituting the inner fin 6 on each of the load side 10 and the no-load side 11 may be disposed so that the air pressure distributions in the spaces on the load side 10 and the no-load side 11 are caused to be different to each other.

It is preferable that the inner fin 6 has a shape which has no hooking portion when the inner fin 6 is released from the molding die in order to keep easiness of the molding.

The no hooking shape means that since the inner fin 6 connected to the rotor 1 is generally molded using, for example, a molding die, the shape is required to be capable of easily releasing the inner fin 6 from the molding die at the molding. Namely, although the inner fin 6 having an efficient agitation power may be formed using a three dimensional fin 61, however, it is preferable that the shape of the inner fin 61 has no hooking portion in consideration of cost reduction of the molding.

With the molding described above, the present invention can be embodied only by changing a shape of the inner fin 6 at the molding, thereby resulting in large manufacturing cost reduction. Meanwhile, it is not the case when the improvement of heat dissipation performance is prioritized rather than the manufacturing cost.

Alternatively, when a motor component (a component constituting a motor) other than the inner fin 6 connected to the rotor 1 agitates air in a space inside the housing 5 by the rotation of the rotor 1, one of a shape, a volume, a setting position and a setting angle or several of them of the motor component may be set so that air pressure distributions caused by the motor component in the spaces on the load side 10 and the no-load side 11 are different between the load side 10 and the no-load side 11 at respective end sides of the rotor 1 in the axial direction.

<Wind Holes 15a, 15b>

As described above, in the totally enclosed motor Z, the wind holes 15a, 15b through which a circulating air passes in the axial direction, or at least two wind holes having a similar function to the wind holes 15a, 15b are disposed in the rotor 1, in the stator 2, in the rotary shaft 3, or in a material forming the housing 5, separately from a gap between the rotor 1 and the stator 2 so that air agitated inside the spaces on the load side 10 and the no-load side 11 circulates a whole enclosed space inside the housing 5.

It is preferable that tow or more than two wind holes 15a, 15b are disposed at positions having a different length in the radial direction centered around the rotation center of the rotary shaft 3 (rotor 1) on the upper half or the bottom half of a cross section of a motor centered around the rotary shaft 3. As a result, with respect to a pressure distribution of air generated by the rotation of the inner fin 6, a pressure difference in the radial direction becomes dominant, and thereby, for example, an air flow flowing into from one of the two wind holes 15a, 15b and flowing out from the other is likely to be generated.

<Effects and Operations>

According to the totally enclosed motor Z of the first embodiment, since the agitation power of the inner fin 6 by the rotation of the rotor 1 for the air inside the housing 5 increases, the cooling performance is improved. In addition, since the pressure distributions of air in the spaces on the load side 10 and the no-load side 11 are different to each other, and thereby, since a pressure gradient is generated between the spaces on the load side 10 and the no-load side 11, an air flow communicating between the load side 10 and the no-load side 11 can be generated by disposing at least two wind holes 15 (15a, 15b) between the spaces on the load side 10 and the no-load side 11 inside the housing 5.

Therefore, air inside the housing 5 can be circulated efficiently between the spaces on the load side 10 and the no-load side 11 by improving the agitation performance of the inner fin 6 without changing a length of the totally enclosed motor Z in the axial direction, and a local heat generation of the totally enclosed motor Z can be homogenized within the whole motor, thereby resulting in improvement of the cooling performance.

Second Embodiment

Figure 3:
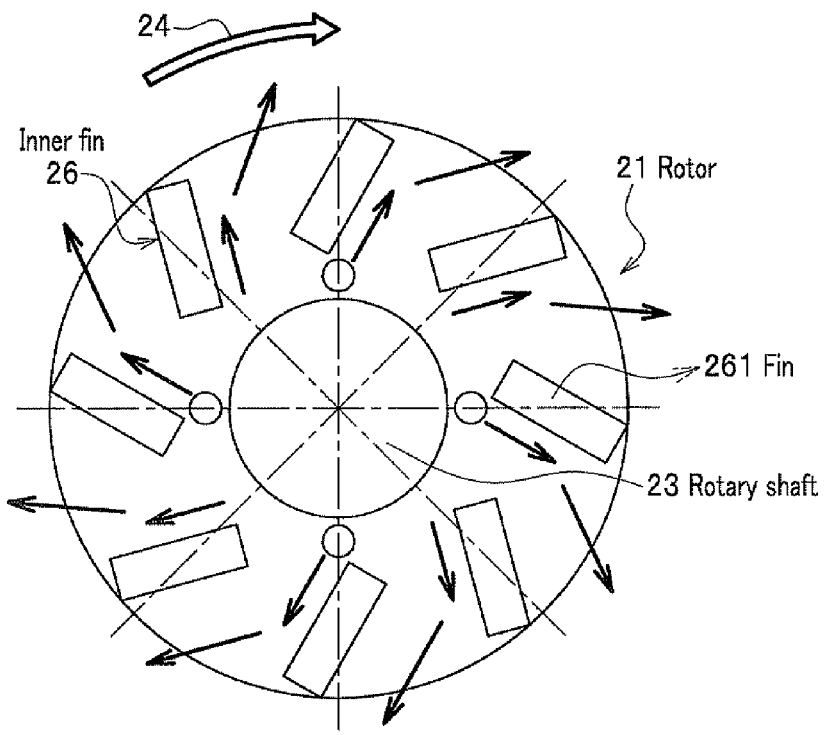
FIG. 3 is a cross sectional view of the rotor of FIG. 1A as seen from a direction indicated by the arrow A according to a second embodiment of the present invention.

FIG. 3 is a cross sectional view of the rotor 21 of FIG. 1A as seen from a direction indicated by the arrow A according to a second embodiment of the present invention.

An inner fin 26 of the rotor 21 according to the second embodiment has such a structure that an inclination direction of the fin 61a of the inner fin 6a according to the first embodiment shown in FIG. 2 is inclined to the rotation direction 24. In the inner fin 26, a pressure difference of air, which is blown out from the center side of the inner fin 26 by the centrifugal force, between the center side and the outer side of the inner fin 26 is also large as with the inner fin 6a according to the first embodiment shown in FIG. 2, and the air volume and the wind velocity increase, accordingly. In addition, since a turbulent flow around the center side of the inner fin 26 is reduced, air is efficiently blown out from the inner fin 26.

As a result, according to the inner fin 26 of the second embodiment, a pressure loss between the center side and the outer side of the inner fin 26 becomes large in comparison with the conventional one. In addition, the air volume and the wind velocity of the air flow blown out by the centrifugal force increase. Therefore, the agitation power of the inner fin 26 by the rotation of the rotor 21 for the air inside the housing increases, thereby resulting in improvement of the cooling performance.

Third Embodiment

Figure 4A:
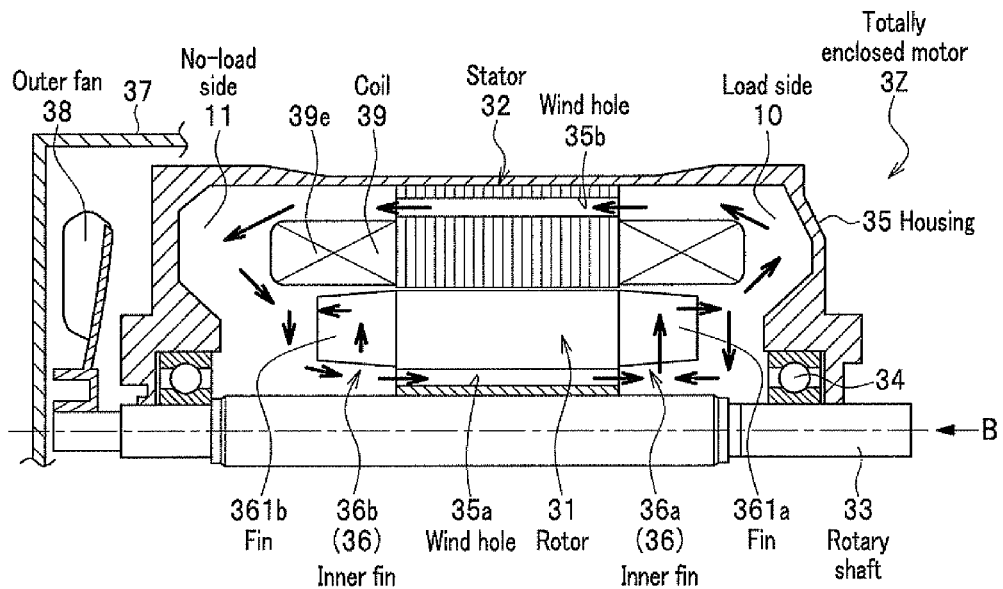
FIG. 4A is a vertical cross sectional view of a totally enclosed motor in an axial direction according to a third embodiment of the present invention.
Figure 4B:
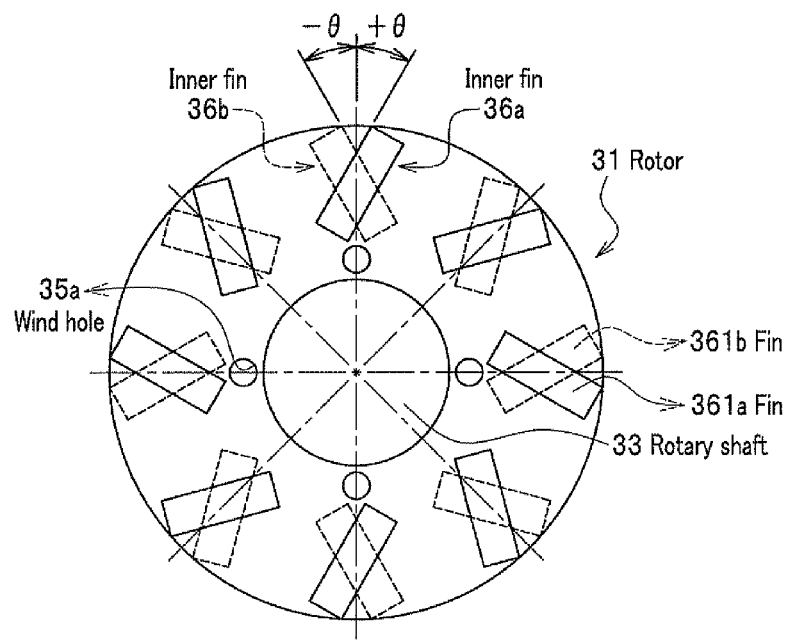
FIG. 4B is a cross sectional view of a rotor of FIG. 4A as seen from a direction indicated by an arrow B.

FIG. 4A is a vertical cross sectional view of a totally enclosed motor 3Z in an axial direction according to a third embodiment of the present invention, and FIG. 4B is a cross sectional view of a rotor 31 of FIG. 4A as seen from a direction indicated by an arrow B.

In the totally enclosed motor 3Z according to the third embodiment, a fin 361a of an inner fin 36a (36) on the load side 10 and a fin 361b of an inner fin 36b (36) on the no-load side, which are disposed on respective end sides of the rotor 31 in the axial direction, are inclined at the same angle to directions opposite to each other from the radial direction centered around the rotation center of a rotary shaft 33 (rotor 33). When the inclination angle of the inner fin 36a on the load side is set to +θ, the inclination angle of the inner fin 36b on the no-load side is set to −θ.

In addition, a wind hole 35a is disposed in a portion of a rotor 31 close to the rotary shaft 33 in the extending direction of the rotary shaft 33, and a wind hole 35b is disposed in a portion of a stator 32 close to an inner wall of a housing 35 in the extending direction of the rotary shaft 33.

As a result, in the totally enclosed motor 3Z according to the third embodiment, a pressure difference between the center side and the outer side of each of the inner fins 36 (36a, 36b) on the load side 10 and the no-load side 11 becomes large, and the air volume and the wind velocity of the air flow blown out from the inner fin 36 by the centrifugal force increases in comparison with the case of the conventional inner fin 106 shown in FIG. 9. Therefore, the agitation power for the air around the inner fins 36 (36a, 36b) in the spaces on the load side 10 and the no-load side 11 inside the housing 35 increases, and the cooling performance can be improved, accordingly.

In addition, by disposing wind holes 35a, 35b in the rotor 31 close to the rotary shaft 33 and in the stator 32 close to the inner wall of the housing 35, respectively, in the extending direction of the rotary shaft 33, when a pressure difference between the center side and the outer side of the inner fin 36a on the load side 10 is larger than that of the inner fin 36b on the no-load side 11, if, for example, a pressure gradient that a pressure on the no-load side 11 is higher than that on the load side 10 is generated between the center side of the inner fin 36a on the load side 10 and the center side of the inner fin 36b on the no-load side 11, a part of air on the center side of the inner fin 36b on the no-load side 11 flows into the center side of the inner fin 36a on the load side 10 through the wind hole 35a disposed in the rotor 31 close to the rotary shaft 33. Then, since an air volume flowing into the inner fin 36a on the load side 10 increases, an air volume blown out from the inner fin 36a on the load side 10 increases, and an air pressure in the space on the load side 10 becomes high. As a result, a part of air blown out from the inner fin 36a on the load side 10 flows into the no-load side 11 through the wind hole 35b of the stator 32 close to the inner wall of the housing 35.

Accordingly, an air flow circulating between the load side 10 and the no-load side 11 inside the housing 35 can be generated, and a cooling effect larger than before can be obtained. In addition, since a circulating air flow flows in a space between the housing 35 and around a coil end 39e, a local heat generation can be reduced.

Furthermore, in the totally enclosed motor 3Z according to the third embodiment, the inner fin 36a on the load side 10 and the inner fin 36b on the no-load side 11 are inclined at the same angle (+θ, −θ, see FIG. 4B) to the directions opposite to each other. Therefore, air volumes circulating around the inner fin 6 by the forward and reverse rotations are different between the load side 10 and the no-load side 11. However, since there is an air flow circulating between the load side 10 and the no-load side 11 inside the housing 35 through the wind holes 15a, 15b, the air flow volume is the same for the right and the left rotations (forward and reverse rotations), thereby resulting in an identical cooling performance for the forward and the reverse rotations.

Therefore, an air flow volume circulating inside the housing 35 is constant for the right and the left rotations (forward and reverse rotations), and an identical cooling performance can be obtained regardless of the rotation direction.

Fourth Embodiment

Figure 5:
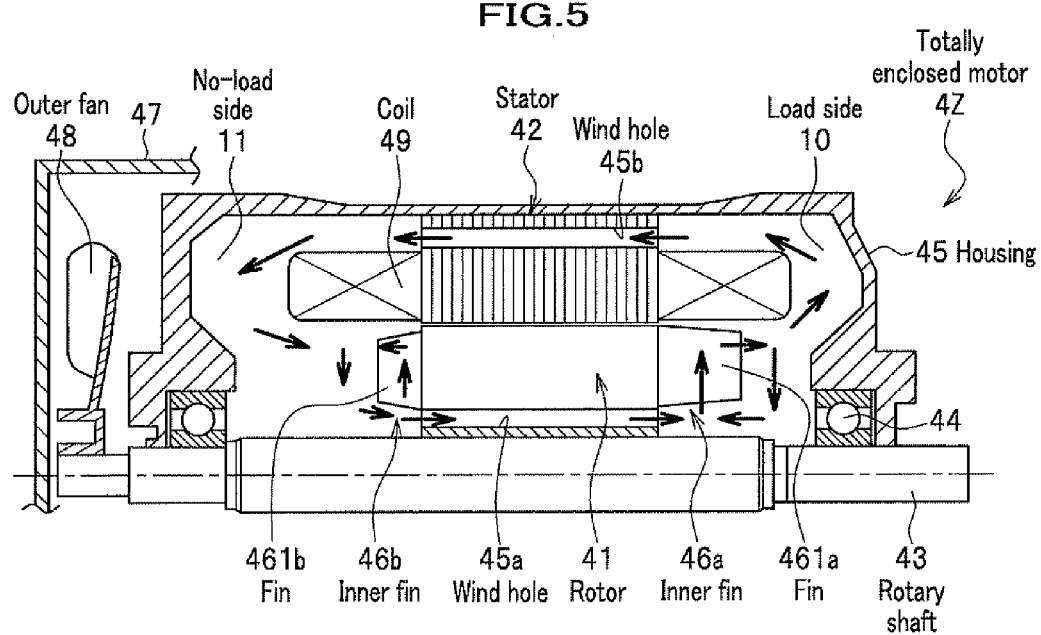
FIG. 5 is a vertical cross sectional view of a totally enclosed motor in an axial direction according to a fourth embodiment of the present invention.

FIG. 5 is a vertical cross sectional view of a totally enclosed motor 4Z in an axial direction according to a fourth embodiment of the present invention.

In the totally enclosed motor 4Z, a length of an inner fin 46b in the axial direction connected to a rotor 41 on the no-load side 11 is set to be shorter than that of an inner fin 46a on the load side 10, and the other constituents are the same with those of the third embodiment shown in FIG. 4A and FIG. 4B.

According to the totally enclosed motor 4Z of the fourth embodiment, since a pressure difference is generated between air in the space on the load side 10 and air in the space on the no-load side 11, while an air flow circulating around the inner fin 46b on the no-load side 11 decreases, air inside the housing 45 circulates through a wind hole 45a formed in the rotor 41 and a wind hole 45b formed in the stator 42, thereby resulting in improvement of the cooling performance.

In addition, since the length of the inner fin 46b in the axial direction on the no-load side 11 is formed to be short, an amount of material to be used for the inner fin 46b decreases, thereby resulting in cost reduction.

Meanwhile, when a length of the inner fin 46a in the axial direction on the load side 10 is set to be shorter than that of the inner fin 46b on the no-load side 11, the identical cooling effect as well as cost reduction can be obtained.

Fifth Embodiment

FIG. 6 is a vertical cross sectional view of a totally enclosed motor 5Z in an axial direction according to a fifth embodiment of the present invention.

In the totally enclosed motor 5Z, a number of fin of the inner fin connected to a rotor 51 on the no-load side 11 is set to zero, and the other constituents are the same with those of the third embodiment shown in FIG. 4A and FIG. 4B.

According to the totally enclosed motor 5Z of the fifth embodiment, since an air flow is generated by an inner fin 56a on the load side 10, while an air flow flowing around a portion where an inner fin on the no-load side 11 is to be disposed decreases, a pressure difference between air on the load side 10 and air on the no-load side 11 inside a housing 55 is generated, and air circulates inside the housing 55 through a wind hole 55a formed in the rotor 51 and a wind hole 55b formed in a stator 52, thereby resulting in improvement of the cooling performance. In addition, since the inner fin 56a is disposed only on the load side 10, an amount of material to be used for manufacturing the inner fin decreases, thereby resulting in cost reduction.

Meanwhile, instead of the case of FIG. 6, if a number of fin 561a of an inner fin 56a on the load side 10 is set to be zero, while disposing a fin of an inner fin on the no-load side 11, the identical cooling effect as well as cost reduction can be obtained.

Sixth Embodiment

Figure 7A:
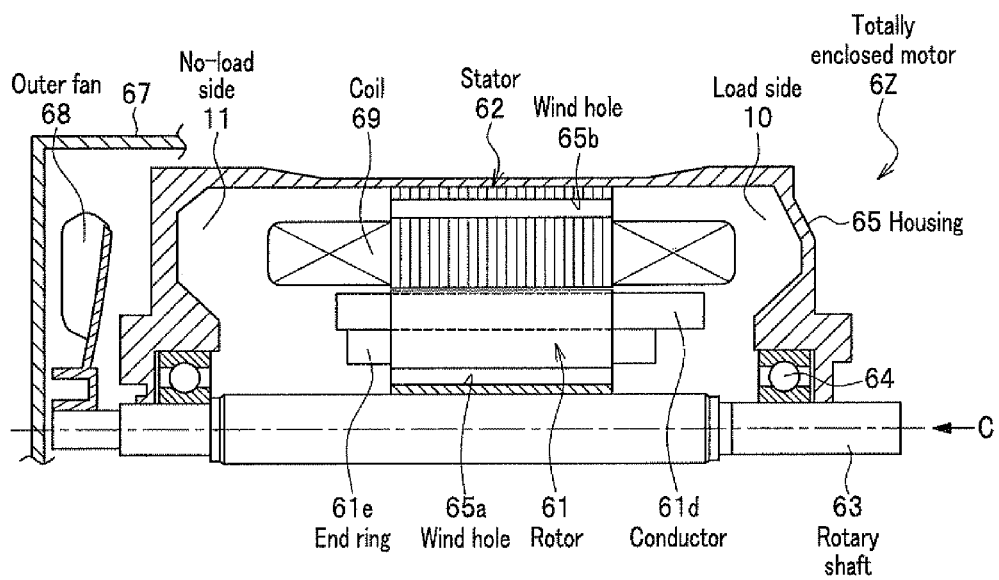
FIG. 7A is a vertical cross sectional view of a totally enclosed motor in an axial direction according to a sixth embodiment of the present invention.
Figure 7B:
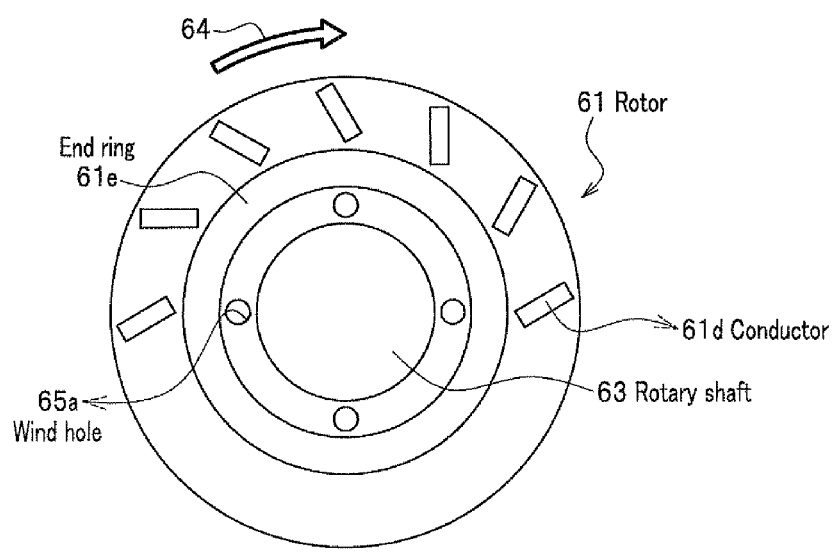
FIG. 7B is a cross sectional view of a rotor of FIG. 7A as seen from a direction indicated by an arrow C.

FIG. 7A is a vertical cross sectional view of a totally enclosed motor 6Z in an axial direction according to a sixth embodiment of the present invention, and FIG. 7B is a cross sectional view of a rotor 61 of FIG. 7A as seen from a direction indicated by an arrow C.

In the totally enclosed motor 6Z according to the sixth embodiment, shapes of constituents constituting the totally enclosed motor 6Z, for example, an end ring 61e of a rotor 61 and a conductor 61d are changed between the load side 10 and the no-load side 11 inside a housing 65.

The other constituents are the same with those of the foregoing embodiment.

According to the totally enclosed motor 6Z of the sixth embodiment, since the shapes of the constituents of the totally enclosed motor 6Z such as the end ring 61e and the conductor 61d are different between the load side 10 and the no-load side 11 inside the housing 65, a pressure gradient is generated between air on the load side 10 and air on the no-load side 11 inside the housing 65 when the rotor 61 rotates. Therefore, the air circulates inside the housing 65 through a wind hole 65a of the rotor 61 and a wind hole 65b of the stator 62, thereby resulting in improvement of the cooling performance.

In addition, since sizes of the constituents of the rotor 61 on the no-load side 11 are smaller than those on the load side 10, an amount of material to be used for the rotor 61 decreases, thereby resulting in cost reduction.

Meanwhile, in the sixth embodiment, the end ring 61e and the conductor 61d are exemplified as the constituents constituting the totally enclosed motor 6Z. However, constituents constituting the totally enclosed motor 6Z other than the end ring 61e and the conductor 61d may be used by changing a shape, volume, setting position or setting angle, or several of those between the respective end sides of a rotary shaft 63 of the rotor 61 in the extending direction.

For example, a constituent of the rotor 61 other than the end ring 61e and the conductor 61d, a shape of the stator 62 and an inner shape of the housing 65 that are the other constituents may be changed between the load side 10 and the no-load side 11 inside the housing 65. For example, the inner shape of the housing 65 may be formed so that volumes (capacity) on the load side 10 and the no-load side 11 are different to each other in order to enlarge a pressure gradient between the load side 10 and the no-load side 11.

Seventh Embodiment

Figure 8:
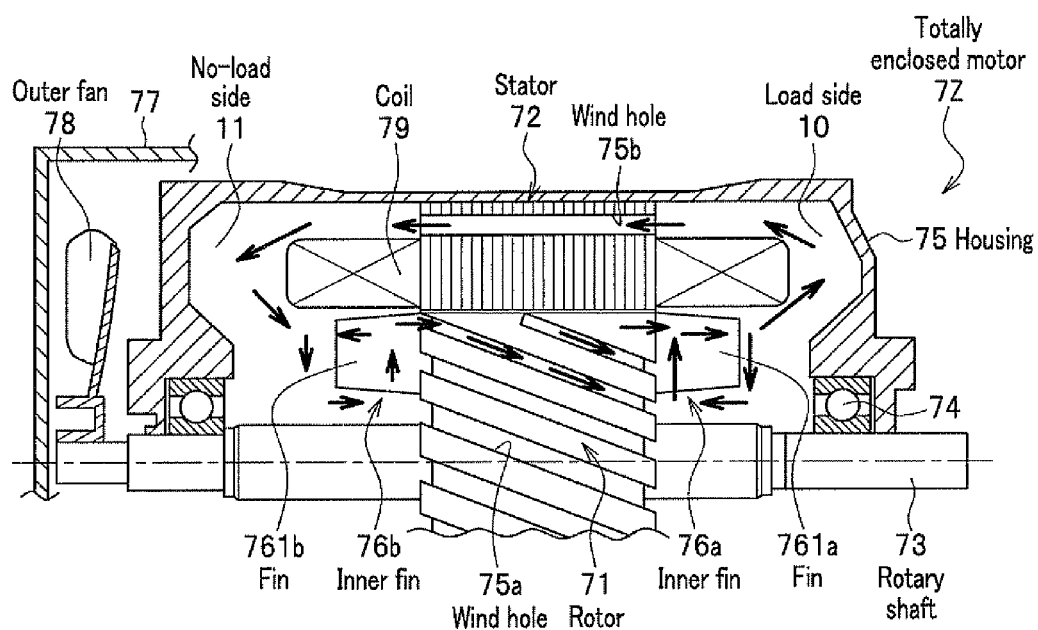
FIG. 8 is a vertical cross sectional view of a totally enclosed motor in an axial direction according to a seventh embodiment of the present invention.

FIG. 8 is a vertical cross sectional view of a totally enclosed motor 7Z in an axial direction according to a seventh embodiment of the present invention.

In the totally enclosed motor 7Z according to the seventh embodiment, a groove inclined from the extending direction of a rotary shaft 73 (rotation center of rotor 71) such as a spiral shaped groove, or a wind hole 75a having the similar function with the groove is disposed on an outer surface of a rotor 71 having substantially a columnar shape. It is noted that in FIG. 8, an air flow inside the housing 75 is indicated by arrows.

The wind hole 75a of the rotor 71 is disposed so that a pressure difference between the center side and the outer side of the inner fin 76 on one end side, from which air flows into the wind hole 75a by the rotation of the rotor 71, of the rotor 71 in the axial direction is larger than a pressure difference between the center side and the outer side of the inner fin 76 on the other end side, from which the air flows out, of the rotor 71 in the axial direction. The other constituents are the same with those of the totally enclosed motor 3Z according to third embodiment shown in FIG. 4A and FIG. 4B.

A different aspect of effects of this embodiment from the effects of the third embodiment of FIG. 4A and FIG. 4B, the fourth embodiment of FIG. 5 and the fifth embodiment of FIG. 6 is that an air flow in the axial direction flowing between the load side 10 and the no-load side 11 by the rotation of the rotor 71 is automatically generated through the wind hole 75a. As a result, air flows into the wind hole 75a from the one end side of the rotor 71 in the axial direction and flows out from the other end side of the rotor 71 in the axial direction, and the air returns through the wind hole 75b of the stator 72.

According to the totally enclosed motor 7Z of the seventh embodiment, an air volume of air flow circulating inside a whole housing 75 is larger than that of the circulating air by only the pressure gradient between the load side 10 and the no-load side 11 according to the embodiments 3, 4 and 5 shown in FIG. 4A and FIG. 4B, FIG. 5 and FIG. 6, and as a result, a higher cooling effect can be obtained.

In addition, since the pressure difference by the inner fin 76a on the side from which air flows into the wind hole 75a, which is disposed in the rotor 71, is larger than the pressure difference by the inner fin 76b on the side from which the air flows out for the right and the left rotations (forward and reverse rotations) of the rotor 71, a volume of the air flow circulating inside the housing 75 is constant, and the totally enclosed motor 7Z can obtain an identical cooling performance as a whole.

Meanwhile, in the seventh embodiment, the wind hole 75a was exemplified by a spiral groove which is disposed on the outer surface of the rotor 71 and inclined from the rotary shaft 73, or by a wind hole having the similar function to the groove. However, for example, a spiral hole inclined from the extending direction of the rotary shaft 73, or a wind hole having the similar function to the spiral hole may be formed inside the rotor 71.

<Operations and Effects>

According to the foregoing embodiments, the agitation power of air inside the housing by the inner fin can be improved, and in addition, an air flow flowing and circulating between the respective ends of each of the rotor and the stator in the axial direction can be generated without increasing a length of the totally enclosed motor in the axial direction.

Therefore, the agitation power in a space inside the housing by the rotation of the rotor increases and an air flow circulating inside the housing is generated. As a result, a cooling performance of the totally enclosed motor can be improved.

Accordingly, the present invention can provide a totally enclosed motor which is reduced in size and weight and capable of suppressing an excessive temperature rise against a lowering of the cooling performance due to increase in heat generation density and decrease in heat dissipation area of the totally enclosed motor.

It is noted that the totally enclosed motors having various kinds of structures have been described in the embodiments 1 to 7. However, these structures may be combined as appropriate, and by combining the structures, combined effects will be obtained.

What is claimed is:

1. A totally enclosed motor, comprising:
    a rotor disposed inside a housing, and configured to transfer heat of the rotor to the housing, wherein the rotor has a shape different between one end side and the other end side, in an extending direction of a rotary shaft of the rotor;
    a stator disposed inside the housing, and configured to transfer heat of the stator to the housing; and
    an inner fin disposed in the rotor, and configured to agitate air inside the housing, wherein the inner fin has a height in the axis direction of the rotary shaft that is smaller than a height of a coil at the stator in the axis direction of the rotary shaft;
    wherein the totally enclosed motor is cooled by a forced convection by an outer fan disposed outside the housing, or by a natural convention in the vicinity of an outer surface of the housing;
    wherein at least two wind holes, other than a gap between the rotor and the stator, passing through between the both end sides in the extending direction of the rotary shaft of the rotor are disposed in at least one of: the rotor, the stator, the rotary shaft, or the housing; and
    wherein a wind hole is formed to be inclined from the extending direction of the rotary shaft on an outer surface of the rotor or within the rotor.

2. The totally enclosed motor according to claim 1, wherein the inner fin constitutes at least one fin disposed on one end side, or a plurality of fins disposed on opposite end sides of the rotor in the extending direction of the rotary shaft of the rotor, and each inner fin comprises at least one fin inclined from a radial direction centered around a rotation center of the rotary shaft.

3. The totally enclosed motor according to claim 2, wherein the at least one fin constituting the inner fin is inclined from the radial direction so that pressure distributions of air, which are generated by a rotation of the rotor, in spaces on the respective end sides in the extending direction of the rotary shaft of the rotor are different to each other.

4. The totally enclosed motor according to claim 3, wherein the at least one fin of the inner fin on the one end side and the at least one fin of the inner fin on the other end side in the extending direction of the rotary shaft of the rotor are inclined from the radial direction at the same angle in directions opposite to each other.

5. The totally enclosed motor according to claim 1, wherein the constituent which constitutes the totally enclosed motor is an end ring or a conductor each constituting the rotor, or other constituents of the rotor other than the end ring and the conductor.

6. The totally enclosed motor according to claim 1, wherein the wind hole is formed in, or as, a spiral groove on the outer surface of the rotor.

7. The totally enclosed motor according to claim 6, wherein for a first and a second location disposed on the wind hole, on opposite sides of the rotor in an axial direction, a distance between a rotary shaft disposed orthogonal to the rotor and the first location on the wind hole is greater than a distance between the rotary shaft disposed orthogonal to the rotor and the second location on the wind hole.

8. The totally enclosed motor according to claim 7, wherein the first location on the wind hole is disposed in a no-load side of the totally enclosed motor, and the second location on the wind hole is disposed in a load side of the totally enclosed motor.

9. The totally enclosed motor according to claim 8, further comprising:
    an additional wind hole, other than a gap between the rotor and the stator, disposed in the stator;
    wherein the wind hole formed as a spiral groove on the outer surface of the rotor is configured to enable an air flow in the axial direction of the rotor, from the no-load side of the totally enclosed motor to the load side of the totally enclosed motor; and
    wherein the additional wind hole is configured to enable a return air flow in the axial direction of the rotor, from the load side of the totally enclosed motor to the no-load side of the totally enclosed motor.

* * * * *